C. C. KEYSER.
AUTOMOBILE CHASSIS.
APPLICATION FILED JAN. 29, 1913.
1,084,446.
Patented Jan. 13, 1914.
2 SHEETS—SHEET 1.
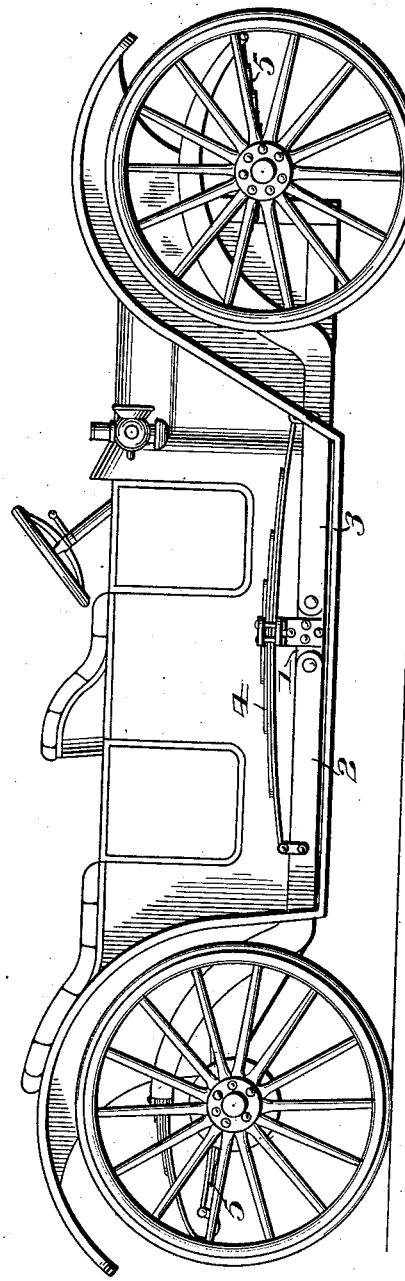
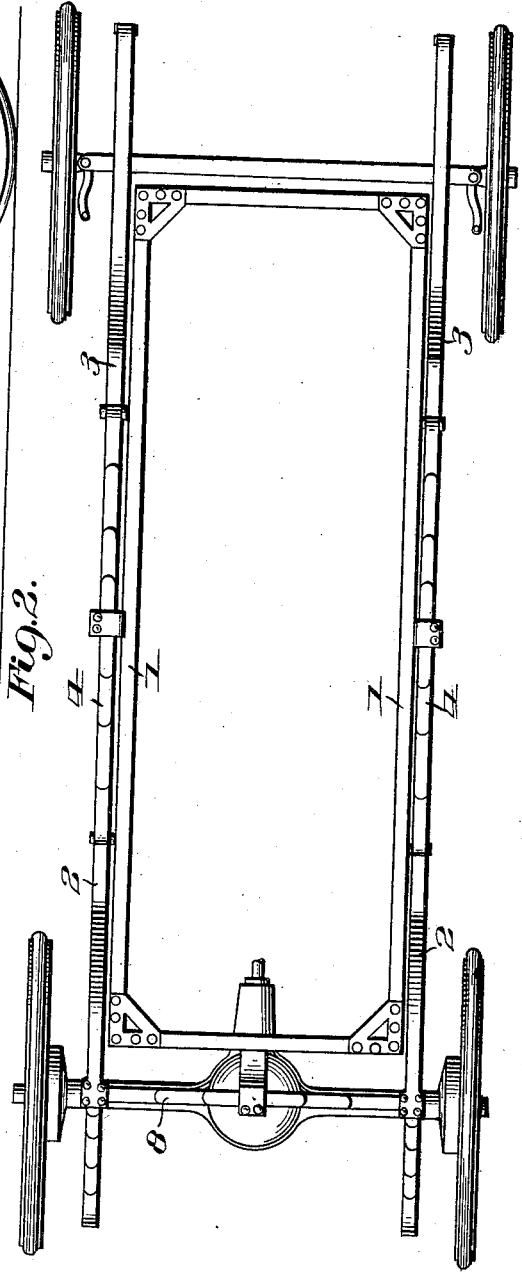
Witnesses
M. H. Slifer
U. B. Hillyard.
Inventor
Charles C. Keyser
By Victor J. Evans
Attorney C. C. KEYSER.
AUTOMOBILE CHASSIS.
APPLICATION FILED JAN. 29, 1913.
1,084,446.
Patented Jan. 13, 1914.
2 SHEETS—SHEET 2.
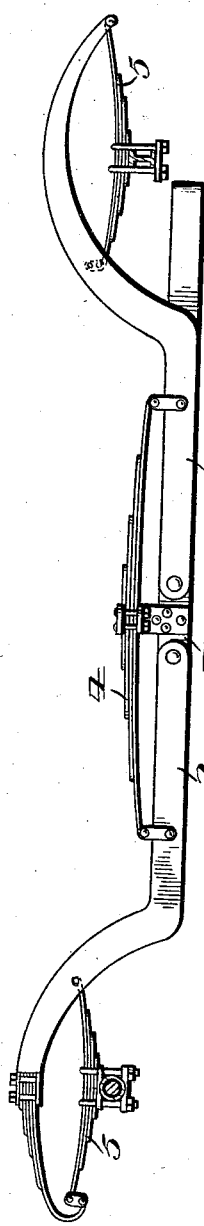
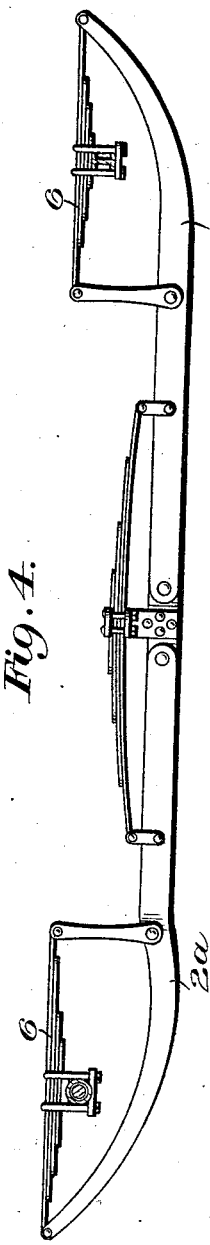
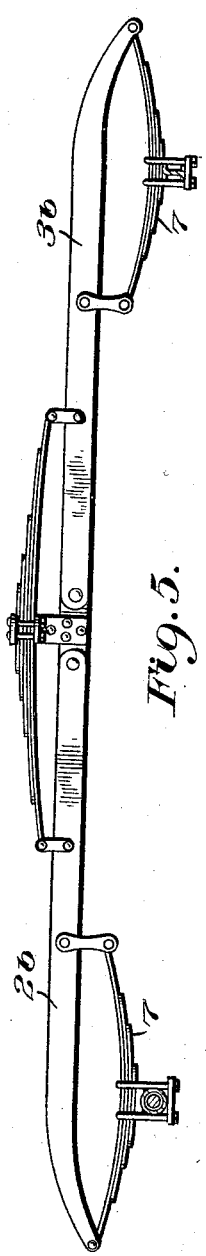
Witnesses
Inventor
Charles C. Keyser
By Victor J. Evans
Attorney

UNITED STATES PATENT OFFICE.

CHARLES C. KEYSER, OF PENSACOLA, FLORIDA.

AUTOMOBILE-CHASSIS.

1,084,446.

Specification of Letters Patent. Patented Jan. 13, 1914.

Application filed January 29, 1913. Serial No. 744,946.

*To all whom it may concern:*

Be it known that I, CHARLES C. KEYSER, a citizen of the United States, residing at Pensacola, in the county of Escambia and State of Florida, have invented new and useful Improvements in Automobile-Chassis, of which the following is a specification.

The invention provides a frame for the running gear of automobiles which admits of the use of wheels of comparatively large diameter and at the same time admitting of the load line being comparatively low, with the result that the chances for the machine overturning are reduced to the smallest amount possible.

The invention further provides a resilient frame, thereby making it possible to successfully use wheels having solid tires.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of an automobile embodying the invention. Fig. 2 is a top plan view of the chassis. Fig. 3 is a side view of the frame. Figs. 4 and 5 are views similar to Fig. 3 of modifications.

Corresponding and like parts are referred to in the following description, and indicated in all the views of the drawings, by the same reference characters.

The main frame of the chassis is oblong or rectangular in form in plan view and comprises end bars and longitudinal bars 1. Side bars 2 and 3 are pivotally connected to the longitudinal bars of the main frame and extend in opposite directions with their outer ends deflected so as to support the vehicle spring to which the front and rear axles are attached. The side bars 2 and 3 are connected to the longitudinal bars 1 approximately at a central point. A side spring 4 is secured at a middle point to a longitudinal bar 1 and overhangs the inner portions of the side bars 2 and 3 and is of such strength as to sustain the load. The extremities of the side spring 4 engage the side bars 2 and 3 some distance from the pivot connections of such side bars with the longitudinal bar.

In the preferred construction, as indicated most clearly in Fig. 3, the outer ends of the side bars 2 and 3 curve upwardly and are located in a higher plane than the main frame. Bow springs 5 are connected at their ends to the curved portions of the side bars 2 and 3 and have the axles attached thereto in any well known manner.

In the modification shown in Fig. 4 the outer ends of the side bars 2ª and 3ª have their outer ends curved upwardly and support flat springs 6 to which the axles are attached.

In the form shown in Fig. 5 the outer ends of the bars 2ᵇ and 3ᵇ curve downwardly and support bow springs 7 to which the axles are connected.

Should it be found necessary the outer ends of the side bars may be connected by means of a transverse spring 8. The body of the machine is supported upon the main frame 1 in any convenient way and in such cases where transverse springs 8 are provided they are connected at a middle point with the main frame 1.

As indicated most clearly in Fig. 1 the supporting frame of the machine is of the drop type, thereby admitting of wheels of comparatively large diameter being used and by reason of the pivoting of the side bars and the provision of the plurality of springs it is possible to use wheels having solid tires, the springs being such as to neutralize shock and vibration and render riding comparatively easy and comfortable.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In vehicle running gear the combination of a main frame, side bars pivoted at their inner ends to the main frame and having their outer ends deflected, vehicle springs supported by the outer portions of the side bars, and other springs connected at a middle point to the main frame and having their outer ends arranged to exert a downward pressure upon the side bars at some distance from their pivotal connection with the main frame.

In testimony whereof I affix my signature in presence of two witnesses.

CHARLES C. KEYSER.

Witnesses:
W. S. LURTON,
THEODORE FRITCH.

Copies of this patent may be obtained for five cents each, by addressing the "Commissioner of Patents, Washington, D. C."